United States Patent [19]
Winzer

[11] Patent Number: 6,091,230
[45] Date of Patent: Jul. 18, 2000

[54] VOLTAGE RECOVERY METHOD FOR A ZINC-AIR BATTERY

[75] Inventor: Jochen Winzer, Hamden, Conn.

[73] Assignee: Timex Corporation, Middlebury, Conn.

[21] Appl. No.: 09/157,344

[22] Filed: Sep. 18, 1998

[51] Int. Cl.$^7$ .............. H02J 7/06; H02J 7/24; H02J 7/00; H02M 10/44; H02M 10/48
[52] U.S. Cl. .............. 320/158; 320/132; 320/162; 429/61; 429/91; 429/52
[58] Field of Search .................. 320/132, 134, 320/162, 157, 158; 429/91, 17, 22, 50, 52, 61

[56] References Cited

U.S. PATENT DOCUMENTS

| | | | |
|---|---|---|---|
| Re. 31,413 | 10/1983 | Jaggard | 429/27 |
| 4,105,830 | 8/1978 | Kordesch | 429/27 |
| 4,118,544 | 10/1978 | Przybyla et al. | 429/27 |
| 4,262,062 | 4/1981 | Zatsky | 429/27 |
| 4,292,681 | 9/1981 | Kloss et al. | 568/280 |
| 5,191,274 | 3/1993 | Lloyd et al. | 320/2 |
| 5,307,520 | 4/1994 | Oyamada et al. | 455/347 |
| 5,354,625 | 10/1994 | Bentz et al. | 429/17 |
| 5,451,473 | 9/1995 | Oltman et al. | 429/27 |
| 5,932,367 | 8/1999 | Collien et al. | 429/29 |

*Primary Examiner*—Peter S. Wong
*Assistant Examiner*—Gregory J. Toatley, Jr.
*Attorney, Agent, or Firm*—Carmody & Torrance LLP

[57] ABSTRACT

A method of recovering and restoring the voltage in a zinc-air battery that has dropped below a first threshold. The method includes the steps of decoupling essentially all loads from the zinc-air battery and permitting the voltage to stabilize, sampling the voltage to determine if the voltage of the zinc-air battery is below a second predefined threshold, starting a timer and determining if the voltage has recovered to at least a third predefined threshold prior to the timing out of the timer, and periodically sampling the voltage to determine if the voltage has recovered to a voltage above a fourth predefined threshold for a sustained period of time, the periodic sampling being done if the zinc-air battery fell below the first predefined threshold but did not fall below the second predefined threshold, and upon determination that the voltage of the zinc-air battery has recovered to above the fourth predefined threshold, coupling the loads, previously decoupled from the battery, back to the battery.

6 Claims, 3 Drawing Sheets

Battery collapse detection

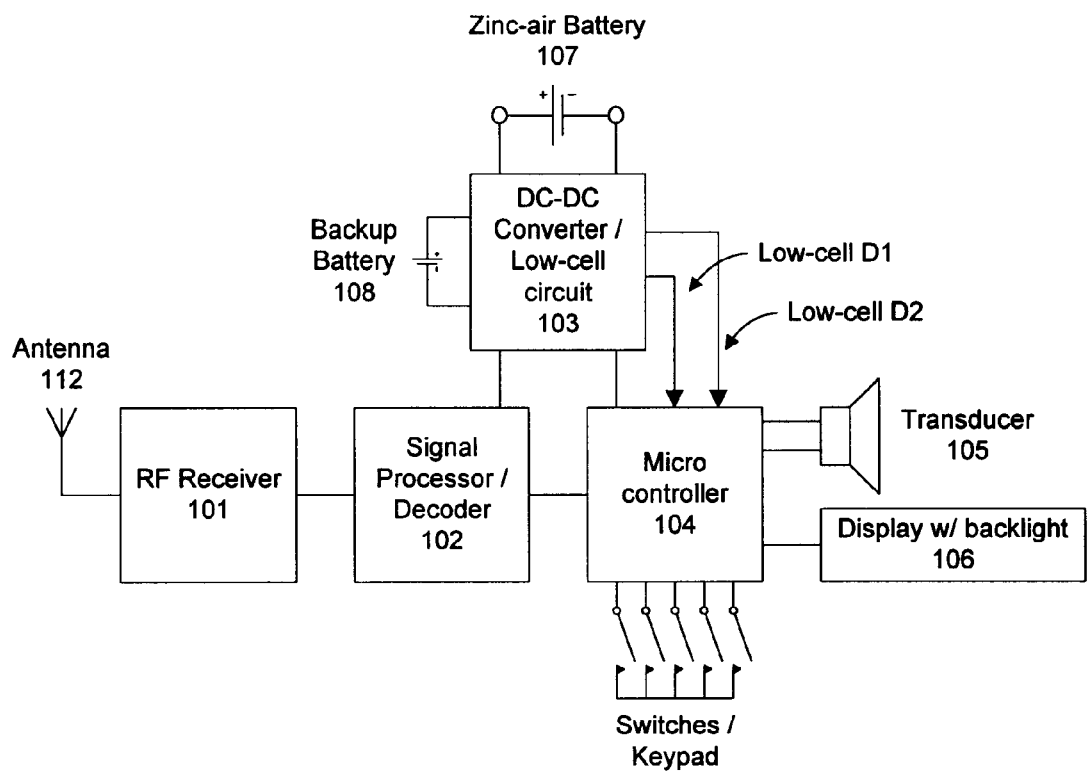
FIG. 1 - Pager watch block diagram

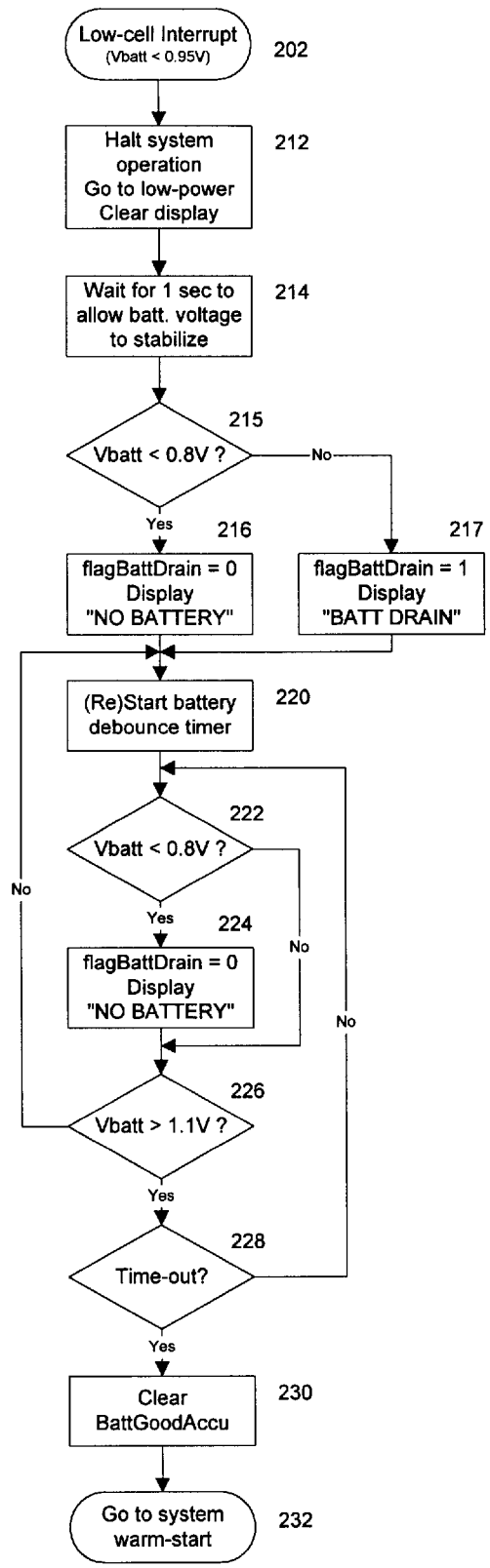
FIG. 2 - Battery collapse detection

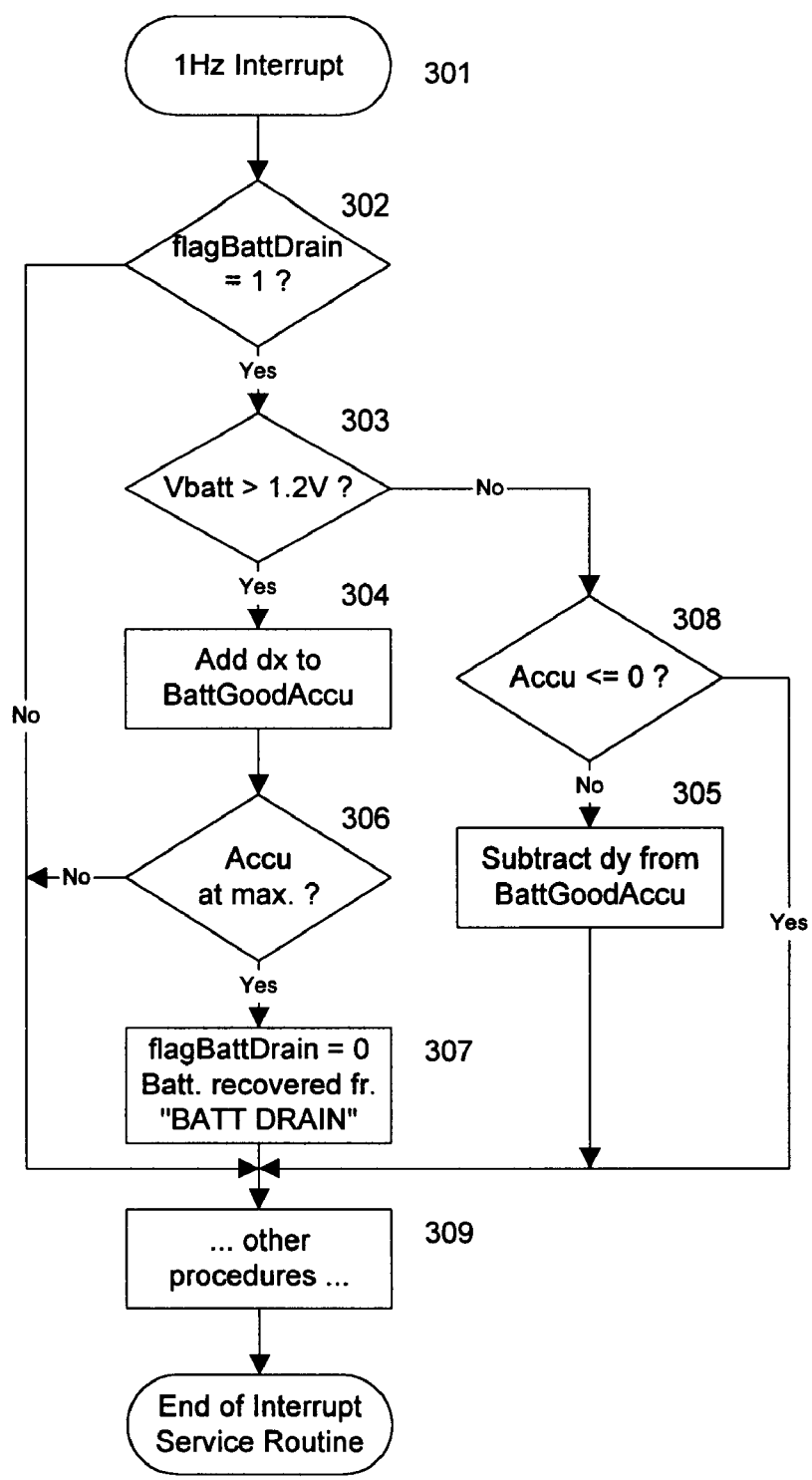
FIG. 3 – Battery Collapse Recovery

VOLTAGE RECOVERY METHOD FOR A ZINC-AIR BATTERY

BACKGROUND OF THE INVENTION

The present invention relates generally to zinc-air batteries, and in particular, to a method of recovering and restoring the voltage in a collapsed zinc-air battery.

Small electronic instruments or devices, such as pagers or combination pager/watches utilize zinc-air batteries for power. In one preferred method, the zinc-air cell is placed in a sealed battery compartment. Oxygen used by the zinc-air cell to produce power is provided through a tiny air hole in the battery chamber. An example of this arrangement can be seen in U.S. application Ser. No. 08/834,133, entitled "Container for Electrical Device Utilizing a Metal Air Cell", and assigned to the present assignee, which is incorporated by reference as if fully set forth herein.

Undesirably, while controlling the relative humidity in the battery compartment, the dimensions of the air hole also limit the flow of oxygen to the zinc-air cell and therefore may limit the average continuous current ($I_{avg}$) that the battery can source. That is, if the device draws more current than $I_{avg}$ over an extended period of time, the battery voltage will collapse. This can result in memory loss within the device and/or cause a system reset. Additionally, the mere incorporation of a back-up battery may not adequately overcome the aforementioned deficiencies, if the device has insufficient recovery procedures.

Accordingly, an improved method of battery detection and battery recovery that overcomes the aforementioned deficiencies and achieves the below mentioned objectives is desired.

SUMMARY OF THE INVENTION

Generally speaking, in accordance with the present invention, a method of recovering and restoring the voltage in a zinc-air battery when the voltage has fallen below a first predefined threshold is provided. In the preferred method, the steps are decoupling essentially all loads from the zinc-air battery and permitting the voltage to stabilize, sampling the voltage to determine if the voltage of the zinc-air battery is below a second predefined threshold, starting a timer and determining if the voltage has recovered to at least a third predefined threshold prior to the timing out of the timer, and periodically sampling the voltage to determine if the voltage has recovered to a voltage above a fourth predefined threshold for a sustained period of time, the periodic sampling being done if the zinc-air battery fell below the first predefined threshold but did not fall below the second predefined threshold, and upon determination that the voltage of the zinc-air battery has recovered to above the fourth predefined threshold, coupling the loads, previously decoupled from the battery, back to the battery.

In a preferred methodology, the first predefined threshold is 0.95V, the second predefined threshold is 0.8V, the third predefined threshold is 1.1V, and the fourth predefined threshold is 1.2V. However, it should be understood that such values are one of design choice and may change while remaining within the scope of the invention. Additionally, the step of determining if the voltage of the zinc-air battery has recovered to above the fourth predefined threshold for the sustained period of time may include the steps of adding to an accumulator a scaling value each time the sampled voltage is above the fourth predefined threshold and subtracting from the accumulator a scaling value each time the sampled voltage is below the fourth predefined threshold, and repeating the adding or subtracting step each time the voltage is periodically sampled until it is determined that the accumulator has reached a predetermined maximum value.

Accordingly, it is an object of the present invention to provide a method of detecting a battery collapse as soon as possible to ensure proper recovery thereof.

Another object of the present invention is to provide an improved method of detecting the removal of the primary battery source within the device.

Another object of the present invention is to provide an improved method of recovering the voltage of a zinc-air battery.

Still other objects and advantages of the invention will in part be obvious and will in part be apparent from the specification.

The invention accordingly comprises the features of construction and methodology which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a simplified block diagram of a pager/watch constructed in accordance with the present invention, the pager/watch utilizing a zinc-air battery;

FIG. 2 is a flowchart illustrating a preferred method of detection and recovery of a voltage collapse in a zinc-air battery in accordance with the present invention; and FIG. 3 is a flowchart illustrating a preferred subroutine to ensure recovery of a zinc-air battery after voltage collapse in accordance with the present invention.

DETAILED DESCRIPTION OF THE PREFERRED EMBODIMENTS

Reference is first made to FIG. 1, which represents a simplified functional block diagram for a device 10, preferably a pager/watch, constructed in accordance with the present invention. As the present invention is applicable to any small electronic device that utilizes a zinc-air battery, the references herein to a combination pager/watch is made by way of example and not limitation.

In a preferred embodiment, an antenna 112 is coupled to an RF receiver 101. Receiver 101 receives incoming signals such as pager messages in a manner well understood by one of skill in the art. The output of RF receiver 101 is coupled to the input of a signal processor/decoder 102 in a manner as also would be understood in the art. A microcontroller 104 which controls the processing of information and other functions in device 10 as would be understood by one skilled in the art, is coupled to the output of decoder 102. A DC—DC converter/low-cell circuit 103 is coupled both to processor/decoder 102 and microcontroller 104. Signal lines between circuit 103 and microcontroller 104 permits circuit 103 to indicate the status of battery 107 to microcontroller 104.

A back-up battery 108 is also provided for providing power in the event that the battery voltage of battery 107 is detected to be less than 0.8V at which point circuit 103 would no longer be functional. Backup battery 108 also provides for the preservation of memory during a battery change. A plurality of keypad switches for controlling the functionality of device 10 in a well known manner are coupled to microcontroller 104. A display 106 (preferably an LCD display) with backlighting capabilities, is also coupled to the output of microcontroller 104. A transducer 105 for emitting sounds, such as melodies, alarms or the like, is also coupled to microcontroller 104.

Generally speaking, microcontroller 104 receives from circuit 103 a two bit data signal, the value of which is indicative of the measured voltage of battery 107 as set forth in the following Table 1:

| BATT. COND. | LOW-CELL D1 | LOW-CELL D2 | POWER SUPPLY |
|---|---|---|---|
| $V_{BATT} > 1.2V$ | 1 | 1 | Battery 107 |
| $1.1V < V_{BATT} < 1.2V$ | 1 | 0 | Battery 107 |
| $0.8V < V_{BATT} < 0.95V$ | 0 | 1 | Battery 107 |
| $V_{BATT} < 0.8V$ | 0 | 0 | Battery 108 |

Reference is now made to FIGS. 2 and 3, which in combination, illustrate the preferred method of detection and recovery of a zinc-air battery 107 upon the occurrence of the removal of battery 107 or upon the occurrence of a battery voltage collapse in battery 107.

As discussed above, microcontroller 104 monitors the values of the low-cell D1/D2 bits. The battery collapse detection routine is commenced when microcontroller 104 detects a zero value on the low-cell D1 bit (step 202). Upon detection of the zero on the low-cell D1 bit, microcontroller 104 halts its normal system operations and brings device 10 into a low power mode by shutting off peripherals, such as receiver 101, signal processor 102 and transducer 105 (step 212). Microcontroller 104 remains in a low-power standby mode. It will now be understood that the load on battery 107 has been essentially minimized which permits the zinc-air cell voltage to stabilize. Such stabilization, at which point no recovery measurements are made, is for preferably about one (1) second (step 214).

Microcontroller 104 now detects whether the low-cell D2 value is also zero (step 215). If the low-cell D2 bit is also low, the indication is that battery 107 has been removed, and power is immediately switched over to backup battery 108. This contingency can also be seen in Table 1. A message such as "NO BATTERY" may be displayed on display 106. Additionally, a flag "flagBattDrain" is reset (step 216).

If the low-cell D2 bit is not zero, the indication is that there is only an undesirable battery overload and drain, and that the battery voltage has dropped below 0.95V but not below 0.8V. In this situation, battery 107 is still powering the device (see Table 1). A message such as "BATT DRAIN" may be displayed on display 106. Flag "flagBattDrain" is also set (step 217).

Device 10 will now wait in its shut down mode until the battery power has been restored to a minimum value to permit normal paging activities(as determined at step 226) by either a new battery being inserted or the battery (battery 107) recovering to at least 1.1V.

After the flag "flagBattDrain" has been properly set or reset, a battery debounce timer (preferably set to 5 seconds) is started (step 220). Microcontroller 104 determines whether the voltage of battery 107 has exceeded 0.8V (step 222). If the battery voltage has not exceeded 0.8V, which may occur if a new battery has not yet been inserted or the user has removed a collapsed battery while waiting for its recovery, the process proceeds to step 224 wherein flag "FlagBattDrain" is reset to zero (or remains reset). If flag "FlagBattDrain" was previously set (step 217), the display may change to the aforementioned "NO BATTERY" message.

In the more likely case that subsequent to the starting of the debounce timer, the voltage of battery 107 has exceeded the threshold 0.8V, then microcontroller 104 determines whether the voltage of battery 107 has exceeded 1.1V (step 226). If the voltage of battery 107 is not detected to be greater than 1.1V, the debounce timer is reset (step 220) and the steps to ensure proper recovery of battery 107 is repeated. Otherwise, battery 107 must be above 1.1V when the debounce timer has timed out (step 228). The ensures stabilization of battery 107.

Once the battery voltage has been stabilized an accumulator "BattGoodAccu" is cleared (step 230), the purpose of which will be discussed below. The system is then rebooted by going through a warm-start procedure (step 232) in preparation of resuming normal operation.

Reference is now made in particular to FIG. 3 which illustrates a preferred subroutine used to further ensure proper recovery and restoration from battery voltage collapse. Full recovery of battery 107 after voltage collapse make take as long as several minutes since oxygen flow to the cell is limited by the size of the air hole.

Accordingly, while battery power is being restored, high current consumption is preferably kept at a minimum to prevent further voltage breakdown. That is, the functionality of transducer 105 and display 106 may remain at a minimum. Alternatively, transducer 105 may be limited to "chirping" as opposed to longer "melodious" alarms. Display 106 may remain "on" since the power consumed by display 106 operating is minimal. However, it is preferable to disable the display's backlighting capability.

In particular, the subroutine of FIG. 3 is preferably executed every second. In the disclosed subroutine, microcontroller 104 monitors the battery recovery and obtains voltage readings from circuit 103 as disclosed above. As will be recalled, if the initial battery collapse was due to the removal of a battery, as opposed to a battery collapse, flag "FlagBattDrain" has been reset. Accordingly, the remaining recovery routine of FIG. 3 would be inapplicable (step 302).

Zinc-air cells are considered fully charged if their voltage is greater than 1.2V. However, during operation of device 10, the voltage of battery 107 may dip below the 1.2V optimal threshold. Accordingly, by sampling the voltage of battery 107 over a period of time, it can be verified that the threshold has been sustained for a preset period of time. As illustrated in FIG. 3, each time the voltage of battery 107 is sampled, an accumulator is incremented or decremented accordingly to the detected voltage. For example, if the detected voltage is greater than 1.2V (step 303) a predetermined weighting factor is added to an accumulator, "BattGoodAccu" (step 304). Battery 107 is sampled each second (step 301) until the accumulator reaches a preset value (step 306) at which point it is determined that the battery has fully recovered (step 307) and all normal paging are resumed such as resuming backlight operations and alarm capability. At this point, flag "FlagBattDrain" is reset. If the detected voltage of battery 107 is less than 1.2V (step 308), the accumulator is decreased by a predetermined weighting factor (step 305). In this way, a designer, based on design parameters, can tailor a recovery time frame for a collapsed battery.

The predetermined weighting factors disclosed herein are determinable by one skilled in the art and based on the following objective. It is known that at the moment of sampling the battery voltage (step 303), the receiver 101 may be "on" therefore pulling the battery voltage below 1.2V and causing step 303 to be answered in the negative. Accordingly, it is desirable to ensure that this dip in the voltage is only a spike and not a prolonged occurrence. Therefore, dx may be set to two (2) for example, while d(y) is set to one (1) thereby ensuring that a stable voltage above 1.2V is detected relatively quickly. Alternately, a higher weighting factor can be associated with dx if it is desirable to give more weight to each sampling above 1.2V. In this way, the system can even more quickly resume normal operations. In this regards, the accumulator in step 206 is set by one skilled in the art keeping in mind the foregoing objective. In the preferred embodiment, the maximum value for the accumulator is 240.

While the battery is fully recovering however, certain functions however, can be maintained (step 309) such as time keeping functions or the like, since such functions minimally drain the recovering battery.

Accordingly, it can be appreciated that the method in accordance with the present invention permits a collapsed battery to adequately recover to its full potential. Additionally, the present invention permits an improved detection methodology of a collapsed battery as soon as possible to ensure the possibility of full recovery. Additionally, the present invention achieves recovery of a collapsed battery with minimal intrusion to the device's functionality.

It will thus be seen that the objects set forth above, among those made apparent from the preceding description, are efficiently attained and, since certain changes may be made in the above methodology without departing from the spirit and scope of the invention, it is intended that all matter contained in the above description or shown in the accompanying drawings shall be interpreted as illustrative and not in a limiting sense. For example, threshold values and timer durations may vary while remaining within the scope of the invention.

It is also to be understood that the following claims are intended to cover all of the generic and specific features of the invention described herein and all statements of the scope of the invention which as a matter of language might fall therebetween.

I claim:

1. A method of recovering and restoring the voltage in a zinc-air battery when the voltage has fallen below a first predefined threshold, the method comprising the steps of:

(a) decoupling essentially all loads from the zinc-air battery and permitting the voltage to stabilize;

(b) sampling the voltage to determine if the voltage of the zinc-air battery is below a second predefined threshold;

(c) starting a timer and determining if the voltage has recovered to at least a third predefined threshold prior to the timing out of the timer; and (d) periodically sampling the voltage to determine if the voltage has recovered to a voltage above a fourth predefined threshold for a sustained period of time, the periodic sampling being done if the zinc-air battery fell below the first predefined threshold but did not fall below the second predefined threshold, and upon determination that the voltage of the zinc-air battery has recovered to above the fourth predefined threshold, coupling the loads, previously decoupled from the battery, back to the battery.

2. The method as claimed in claim 1, including the steps of:

setting the first predefined threshold to at least essentially 0.95V, setting the second predefined threshold to at least essentially 0.8V, setting the third predefined threshold to at least essentially 1.1V, and setting the fourth predefined threshold to at least essentially 1.2V.

3. The method as claimed in claim 1, wherein the step of determining if the voltage of the zinc-air battery has recovered to above the fourth predefined threshold for the sustained period of time includes the further steps of:

adding to an accumulator a scaling value each time the sampled voltage is above the fourth predefined threshold and subtracting from the accumulator a scaling value each time the sampled voltage is below the fourth predefined threshold; and repeating the adding or subtracting step each time the voltage is periodically sampled until it is determined that the accumulator has reached a predetermined maximum value.

4. The method as claimed in claim 3, including the steps of:

resetting a flag when the accumulator has reached the predetermined maximum value; and skipping said adding or subtracting steps if the flag is set.

5. The method as claimed in claim 4, including the steps of resetting the flag if the sampled voltage sampled in step (b) is below the second predefined threshold and setting the flag when the sampled voltage sampled in step (b) is below the first predefined threshold and above the second predefined threshold.

6. A method of recovering and restoring the voltage in a zinc-air battery when the voltage has fallen below a first predefined threshold, the method comprising the steps of:

(a) decoupling essentially all loads from the zinc-air battery and permitting the voltage to stabilize;

(b) sampling the voltage to determine if the voltage of the zinc-air battery is below a second predefined threshold;

(c) starting a timer and determining if the voltage has recovered to at least a third predefined threshold prior to the timing out of the timer; and (d) if the voltage sampled in step (b) was not below the second predefined threshold, periodically sampling the voltage to determine if the voltage has recovered to a voltage above a fourth predefined threshold for a sustained period of time, the periodic sampling being done if the zinc-air battery fell below the first predefined threshold but did not fall below the second predefined threshold, and upon determination that the voltage of the zinc-air battery has recovered to above the fourth predefined threshold, coupling the loads, previously decoupled from the battery, back to the battery.

* * * * *